United States Patent
DeSteese

[15] 3,705,411
[45] Dec. 5, 1972

[54] SHOCK AND THERMAL ISOLATION PACKAGE FOR THERMIONIC BATTERY

[72] Inventor: John G. DeSteese, Kennewick, Wash. 99336

[73] Assignee: McDonnell Douglas Corporation

[22] Filed: Dec. 2, 1970

[21] Appl. No.: 94,455

[52] U.S. Cl. ............174/17.05, 174/50.54, 220/15, 165/69, 165/135, 62/466
[51] Int. Cl. ...............................................H05k 5/06
[58] Field of Search ......174/17.05, 15, 50.5; 215/13; 310/4; 220/9 C, 15; 165/135, 69; 62/465, 466, 45

[56] References Cited

UNITED STATES PATENTS

| | | | |
|---|---|---|---|
| 3,281,372 | 10/1966 | Haas | 310/4 X |
| 2,127,785 | 8/1938 | Schimpf | 215/13 R |
| 1,352,844 | 9/1920 | Smith | 215/13 R |
| 1,663,032 | 3/1928 | Wetmore | 215/13 R |

Primary Examiner—Lewis H. Myers
Assistant Examiner—D. A. Tone
Attorney—Walter J. Jason, Donald L. Royer and D. N. Jeu

[57] ABSTRACT

High temperature thermionic energy converter is supported inside a larger evacuated housing by electrically conductive, thin, flat spring means. Both radial and axial support of the converter are provided by a thin, flat spiral spring at each end thereof. Each spring includes a radially inner periphery which engages a corresponding converter end, and radially outer peripheral (finger) sections that engage respective parts of an annular circumferential area of the internal wall of the housing. Narrow curved fingers of each spring provide radial spring action and long thermal leakage paths to minimize the thermal conductance of the support system. Radical location of the converter is provided by spring action in the plane of the spiral, and axial support of the converter results from a diaphragm effect perpendicular to the spiral plane. Spring portions (snubbers) positioned normally near the housing internal wall limit the extent of radial spring motion by engaging such wall.

12 Claims, 7 Drawing Figures

INVENTOR.
JOHN G. DeSTEESE
BY
- AGENT -

SHOCK AND THERMAL ISOLATION PACKAGE FOR THERMIONIC BATTERY

CROSS-REFERENCE TO RELATED APPLICATION

A radioisotope-fueled thermionic energy conversion device is shown, described and claimed in a copending patent application of Ned S. Rasor, John G. DeSteese and Kenneth A. Gasper, Ser. No. 794,933 filed Jan. 29, 1969 for Thermionic Conversion Atomic Diode Battery, now abandoned.

BACKGROUND OF THE INVENTION

My present invention relates generally to thermal packages for high temperature articles. More particularly, the invention relates to a remarkably simplified and inexpensive thermal packaging technique for insulating and supporting high temperature thermionic energy conversion devices.

In most applications (with the notable exception of outer space systems), the collector (which usually comprises the internal surface of the casing) of a radioisotope-fueled thermionic energy converter operates several hundred degrees above ambient temperatures. Such converters must, therefore, be packaged in a compatible thermal housing which thermally insulates the converter collector from ambient conditions. The accepted solution is to place the converter inside a larger metal housing and fill the contained void region with multifoil or ceramic powder insulation. The housing is then suitably sealed and evacuated. The thickness of the multifoil or ceramic powder insulation is typically in the range of 25 to 100 mils, which results in relatively bulky packages with the usual converters.

Both multifoil and ceramic powder insulation suffer from outgassing problems and require the use of suitable getter materials in the evacuated housing. Further, multifoil insulation has a pressure-dependent thermal conductance and the performance of ceramic powders is unpredictable as a result of variation in packing characteristics. Both types of insulation require in-place adjustments to achieve the desired temperature distribution in the thermal package.

SUMMARY OF THE INVENTION

Briefly, and in general terms, my invention is preferably accomplished by providing a shock and thermal isolation package for a radioisotope-fueled thermionic battery wherein such high temperature thermionic energy converter is supported inside a larger evacuated housing by electrically conductive, thin, flat spring means. Each end of the converter is preferably supported by a thin, flat, metallic spiral spring which centrally mounts the converter end and peripherally engages the internal wall of the housing. Each spiral spring includes a generally annular body from which a set of narrow curved fingers extend in a radially inward direction to engage a converter end essentially at their radially inner peripheries, and another set of narrow curved fingers extend in a radially outward direction to engage the housing internal wall at their radially outer peripheries. The generally annular body preferably has spring portions or snubbers protruding radially outward therefrom and terminating near the internal wall of the housing. These snubbers act as impact energy absorbers or radial spring motion limiters when contacting or engaging the housing internal wall.

The thin, flat, metallic spiral springs provide both radial and axial support of the converter within the larger evacuated housing which is usually metallic. Radial spring action provided by the narrow curved fingers in the plane of each spiral spring serves to support and position the converter radially. The spiral springs also provide a diaphragm effect perpendicular to the plane of each spring to support and position the converter axially. Thermal isolation of the converter is achieved by the long thermal conduction paths provided by the spiral spring fingers. The metallic spiral springs are, of course, also electrically conductive and can serve as electrical conductors between a converter electrode and the housing or respectively between both converter electrodes and separate, electrically insulated, portions of the housing according to the construction of the converter and the housing.

Spring support of the high temperature thermionic battery is the simplest support mechanism which has been found to be thermally feasible and operationally effective. The spring devices allow a considerable reduction in overall size of the final thermal package, and produce the most compact configuration of the various different forms of thermal packages. Clearance in a thermal package constructed according to this invention between the larger housing and usual converter can be as small as 10 mils, for example. Further, since metallurgical and mechanical properties of known metals and alloys are well understood, spring devices of great reliability and accuracy can be consistently and economically produced.

BRIEF DESCRIPTION OF THE DRAWINGS

My invention will be more fully understood, and other features and advantages thereof will become apparent, from the description given below of an exemplary embodiment of the invention. This description of the exemplary embodiment is to be taken in conjunction with the accompanying drawings, in which.

DESCRIPTION OF THE PRESENT EMBODIMENT

Figure 1:
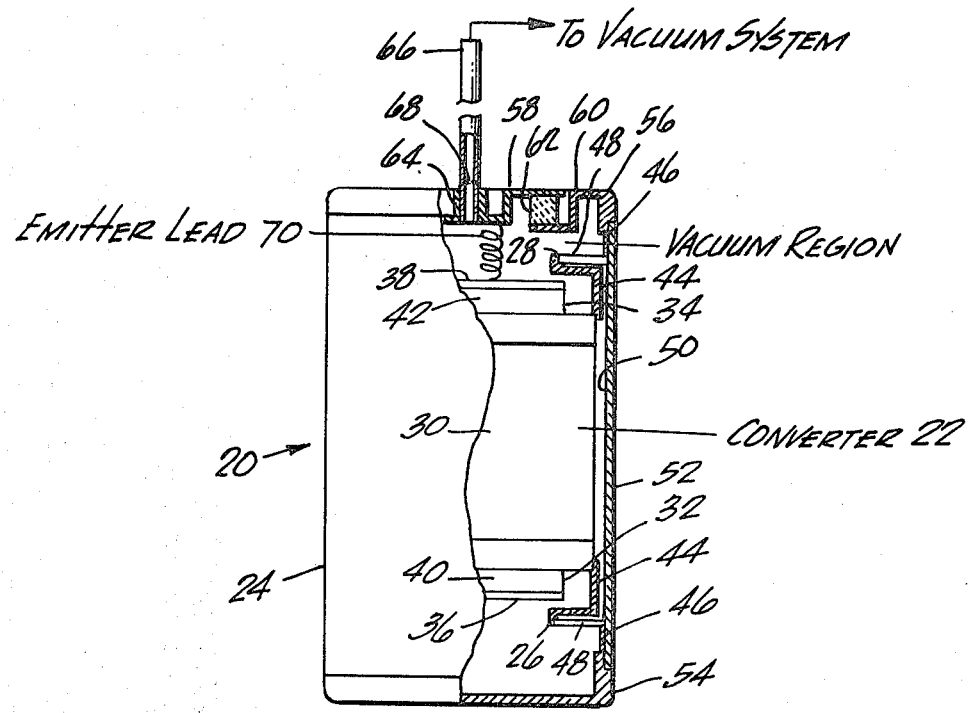
FIG. 1 is an elevational view, shown partially broken away and partially in section, of a shock and thermal isolation package supporting a high temperature thermionic battery therein.

FIG. 1 is an elevational view of an illustrative embodiment of my invention shown partially broken away and partially in section. Shock and thermal isolation package 20 mounts a thermionic energy conversion battery 22 therein. The package 20 includes a cylindrical housing 24 which is larger than the converter or battery 22, and lower and upper sets of battery mounting means 26 and 28. The battery 22 is generally cylindrical in shape and includes a central casing section 30, and lower and upper (reduced diameter) end sections 32 and 34 with respective end discs 36 and 38.

The internal surface of the casing 30 serves as the collector of the battery 22 so that the casing is the battery collector electrode. The end discs 36 and 38 are insulated from the casing 30 by respective (ceramic) insulating collars 40 and 42. The end discs 36 and 38 are suitably connected by respective internal leads (not shown) to the emitter (also not shown) in the battery 22 such that either of the end discs can be used as the battery emitter electrode. The operating temperature of the collector of the thermionic batteries involved is, for example, in the range of 600° to 900° K (327° to 627° C). Thus, the casing 30 or battery 22 has a high temperature of at least 600° K, approximately.

The lower and upper sets of battery mounting means 26 and 28 are substantially identical to each other, and each set includes a mounting ring 44, spacer ring 46 and support device 48. In the upper set of battery mounting means 28, for example, the lower peripheral end of the mounting ring 44 is suitably shaped to engage (press fit) the upper peripheral corner of the casing 30. Similarly, the upper peripheral end of the mounting ring 44 is also suitably shaped to engage (press fit) the radially inner periphery of the support device 48. The radially outer periphery of the support device 48, is, however, contiguous in a radial direction to an annular circumferential area of the internal wall 50 in housing 24.

The housing 24 includes a tubular body 52 having the internal wall 50, a lower end cap 54 and an upper end cap 56. The housing 24 can be generally made of stainless steel and can have an inner diameter (of tubular body 52) over most of its length of 0.86 inch, for example. The rim ends of the end caps 54 and 56 are suitably shaped so that the corresponding ends of the tubular body 52 overlap respective portions thereof. A spacer ring 46 which can have a vertical gap therein is radially spring-fitted within each end of the tubular body 52 and positioned between a support device 48 and its associated end cap. In the upper set of battery mounting means 28, for example, the lower end surface of its spacer ring 46 abuts against the upper edge surface of the support device 48 and the upper end surface of the spacer ring abuts against the lower rim surface of the end cap 56, after assembly (and electron beam welding) of the upper end cap to the corresponding end of the tubular body 52.

The lower end cap 54 is a simple closure member whereas the upper end cap 56 includes a radially inner member 58, a radially outer member 60 and an annular insulating member 62 hermetically joining the inner and outer members together. The inner member 58 has a central collar 64 in which the lower end of a seal tube 66 is welded. The upper end of the tube 66 is connected to a suitable vacuum system. After evacuation of the housing 24 to $10^{-6}$ torr, for example, the tube 66 can be pinched off and sealed leaving a lower end 68 indicated by a broken line in FIG. 1. An emitter lead 70 is connected between the upper end disc (battery emitter electrode) 38 and the insulated inner member 58 of the upper end cap 56. Thus, the inner member 58 and sealed tube end 68 comprise the battery emitter terminal, and the remaining parts of the housing 24 comprise the battery collector terminal.

Figure 2:
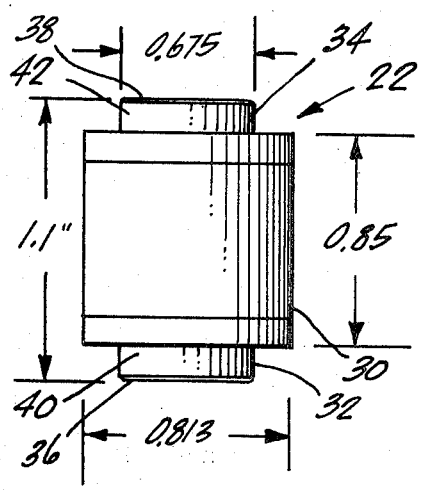
FIG. 2 is an elevational view of the thermionic battery shown mounted in the package of FIG. 1.

FIG. 2 is an elevational view of the illustrative, high temperature, thermionic converter or battery 22. The battery 22 is symmetrical about its vertical central axis and weighs about 100 grams, for example. The casing 30 can be made of tantalum. The battery 22 can have illustrative values of its principal dimensions which are as indicated in FIG. 2. The particular weight, type of material and dimensions of the battery 22 noted above are, of course, merely given as examples only and are not intended to limit the scope of this invention in any manner. All other specific data including weights, types of material and dimensions (configurations) found elsewhere herein are also to be considered exemplary only of the invention.

Figure 3:
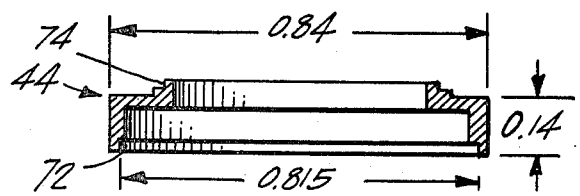
FIG. 3 is a sectional view of a battery mounting ring used in the package of FIG. 1.

FIG. 3 is an enlarged and diametrical sectional view of the mounting ring 44 of the upper set of battery mounting means 28. The mounting ring 44 is a continuous ring which is symmetrical about its vertical central axis. The mounting ring 44 was initially made of aluminum for experimental convenience; however, the mounting ring is preferably made of a thermally resistant material such as stainless steel, Hastelloy, etc., which would provide additional thermal gradient to the support system. Illustrative values of the principal dimensions of interest of the mounting ring 44 are as indicated in FIG. 3. It can be seen that the lower and upper peripheral ends of the mounting ring 44 have respective corner grooves 72 and 74 provided therein to engage the upper peripheral corner of the casing 30 and the radially inner periphery of the support device 48.

Figure 4:
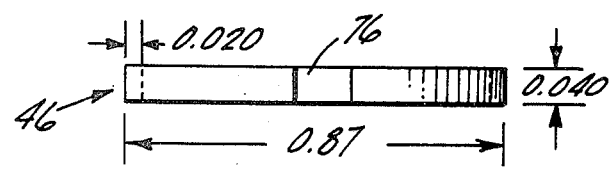
FIG. 4 is an elevational view of a spacer ring used in the package of FIG. 1.

FIG. 4 is an elevational view of one of the spacer rings 46 used in the package 20 shown in FIG. 1. The spacer ring 46 can be conveniently a stainless steel spring washer having the illustrative values of its principal dimensions as indicated in FIG. 4. The spacer ring 46 includes a narrow vertical gap 76 therein, which can be approximately 0.020 inch wide with the spacer ring installed in the housing 24 (FIG. 1). The gap 76 can be, for example, about 0.05 inch wide when the spacer ring 46 is in its relaxed condition. As can be seen in FIG. 1, the spacer ring 46 functions essentially as a longitudinal spacer; however, the mounting ring 44 is right-angled inwardly, which serves to increase the length of the thermal path within a compact axial space and simultaneously position the shaped peripheral end of the mounting ring properly to accommodate the support device 48. Both radial and axial support of the battery 22 are provided by a pair of the support devices 48.

Figure 5:
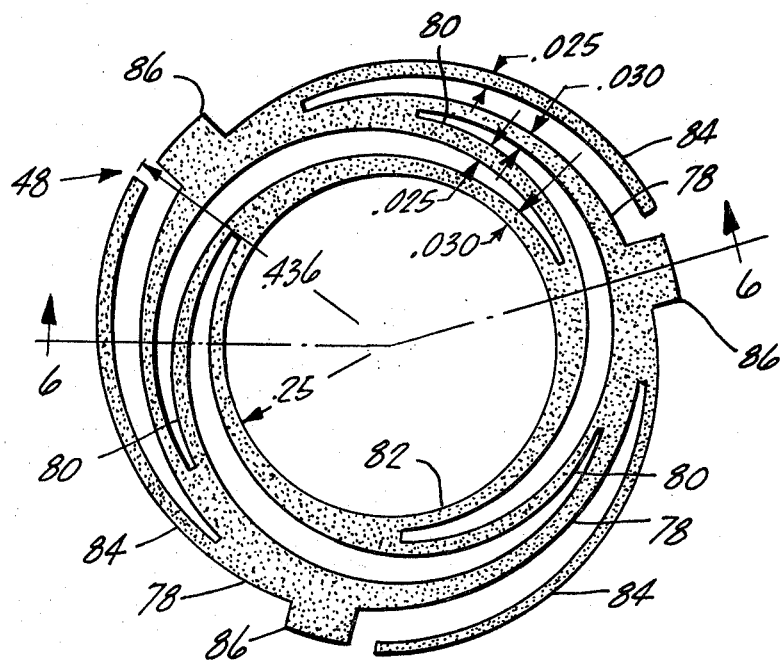
FIG. 5 is an enlarged top plan view of a shock and thermal isolation support device used in the package of FIG. 1, the device being a thin, flat, metallic spiral spring.

FIG. 5 is an enlarged top plan view of the support device 48 which is a thin, flat, metallic spiral spring. The spiral spring 48 includes a generally annular body 78 from which a set of narrow curved fingers 80 entend in a radially inward direction to merge with a circular ring 82, and another set of narrow curved fingers 84 extend in a radially outward direction to engage the internal wall 50 of housing 24 (FIG. 1) normally at their radially outer peripheries. The upper peripheral end of the mounting ring 44 (FIG. 3) is normally engaged by the radially inner periphery of the circular ring 82.

The generally annular body 78 preferably includes a set of snubbers 86 which protrude radially outward from the annular body and terminate a predetermined distance from the outermost periphery of the fingers 84. When the spring 48 is properly installed in the housing 24, the radial spacing between the outermost periphery of one of the fingers 84 (or internal wall 50) and the outer periphery of its adjacent snubber 86 is, for example, about 0.002 inch in the exemplary embodiment of this invention. Such spacing can be varied or adjusted to limit travel (radial displacement) of the battery 22 according to environmental conditions.

Figure 6:
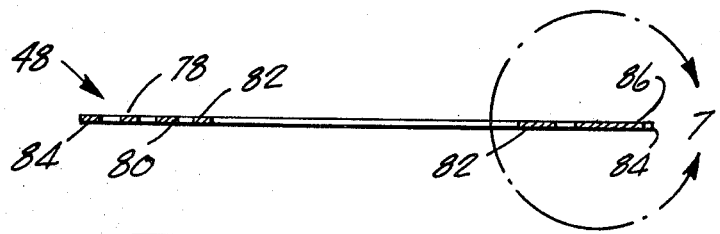
FIG. 6 is a sectional view of the support device, as taken along the line 6—6 indicated in FIG. 5.

FIG. 6 is a sectional view of the spiral spring 48, as taken along the line 6—6 indicated in FIG. 5. The spring 48 was, for example, chemically milled from 20 mils thick, type 304 stainless steel, to the configuration shown in FIGS. 5 and 6 with the values of principal dimensions as indicated in FIG. 5. The snubbers 86 strike or engage the housing internal wall 50 (FIG. 1) when the battery 22, each end of which is mounted in the circular ring 82 of a corresponding spiral spring 48, is radially displaced to deflect the fingers 80 and 84 a sufficient amount. The spiral springs 48 are designed to provide a wide range of shock and vibration protection to the battery 22, in addition to their main function of thermally isolating it by means of long thermal conduction paths provided by the spiral spring fingers 80 and 84.

The specific illustrative embodiment of the support devices 48 used to mount the battery 22 provides shock and vibration protection up to about 100 gravity units. The usual thermionic battery 22 of the type shown herein can withstand shocks without damage up to about 50 gravity units, for example. The transmission characteristics of the support system (devices 48) are established (empirically at present) to maintain the load transmitted to the battery 22 well below its critical level for any applied load that the support system can sustain. Accordingly, there is little danger that the battery 22 will be damaged from shocks before the support system may be caused to fail. Of course, it is extremely unlikely that the thermal package 20 would ever be subjected to loads that might endanger any component or part of the package under ordinary usage. High frequency vibrations above the relatively low resonant frequency (20 cps, for example) of the support system are greatly damped (down to only a few percent of original magnitude) by the characteristics of the support devices 48. Thus, transmission of harmful high frequency vibrations of the thermal package 20 to the battery 22 is substantially precluded.

The illustrative converter or battery 22 is a nominally 4 watts thermal, promethia-fueled, device mounted in a spring-supported, radiatively-coupled (between casing 30 external and housing 24 internal surfaces) thermal package 20. Operation of the battery 22 at the maximum power point (7.5 milliwatts electrical at 0.22 volt output) corresponded to collector (casing) and housing temperatures of 700° K and 335° K, respectively. Thus, the equilibrium temperature difference between the casing 30 and housing 24 reached 365° K in the $10^{-6}$ torr vacuum.

Figure 7:
FIG. 7 is a fragmentary and modified view of a portion of the support device, as taken along the line 7—7 indicated in FIG. 6, showing a variation of such device.

FIG. 7 is a fragmentary and modified view of a portion of the support device or spiral 48, as taken along the line 7—7 indicated in FIG. 6, showing a variation of the support device. In this variation of the spiral spring 48, the snubbers 86 are angularly bent down (or up) to provide a new and progressively variable rate of retardation of radial displacement of the supported battery 22 (FIG. 1). It can be seen that as the peripheral edge end of a snubber 86 contacts the internal wall 50 of the tubular body 52 of housing 24, the angularly bent condition of the snubber allows it to act as a separate spring element so that a modified reaction force is applied to the spiral spring fingers 80 and 84. The spiral spring 48 can thus be given a new compression or response rate to control radial displacement of the battery 22.

The cross section of the spiral spring 48 shown in the top plan view of FIG. 5 is generally constant along its length. That is, the spring 48 has a fixed thickness, and the inner curved fingers 80 and outer curved fingers 84 are of generally constant radial widths (of 0.025 inch, for example). The cross section of each spring 48 need not be constant along its length, however. In fact, it can be shown by the calculus of variations that a uniform cross section, $A(x) =$ constant, maximizes the conduction heat loss q, $$q = \frac{k(\Delta T)}{\int_0^1 \frac{dx}{A(x)}},$$

across the temperature drop ΔT, through a spring of length 1 and thermal conductivity k, for a fixed volume of spring material. A tapering cross section (fixed thickness and tapering width fingers, for example) reduces the conduction losses between the (inner and outer) ends of the spiral spring 48. Actually, this condition is met to a certain extend in that the inner end portions of the fingers 80 and 84, extending outwardly from the circular ring 82 and annular body 78, respectively, are radially wider than their main finger portions.

The spiral spring 48 can have configurations other than that of a thin flat disc with rectangular cross sectional fingers 80 and 84. It can, for example, be formed from a small diameter wire wound in a conical spiral wherein one (cone) end suitably engages an end of the battery 22 and the other end suitably engages a portion of the tubular body 52 or of an associated end cap (54 or 56). Also, instead of mounting a normally high temperature article, the thermal package 20 can be obviously used to mount either a normally ambient or normally low temperature article. Thus, while an exemplary embodiment of this invention has been described above and shown in the accompanying drawings, it is to be understood that such embodiment is merely illustrative of, and not restrictive on, the broad invention and that I do not desire to be limited in my invention to the details of construction or arrangement shown and described, for obvious modifications may occur to persons skilled in the art.

I claim:

1. A thermal isolation package for mounting and containing a relatively high temperature article therein, said package comprising:

a housing larger than said article and enclosing the same therein, said housing being evacuated to a predetermined degree and sealed;

support means including an inner end portion mounting said article and an outer end portion engaging said housing, said support means having a construction providing low thermal conduction losses between said end portions whereby said article is supported and thermally isolated in said housing by said support means, and said support means comprises spring means having a generally spiral configuration which provides a long thermal conduction path between said end portions and which provides both radial and axial alignment support of said article in said housing; and means for limiting displacement of said article from its normally aligned position in said housing.

2. The invention as defined in claim 1 wherein said spring means is made of electrically conductive material whereby said spring means can serve additionally as an electrical conductor between said article and said housing.

3. A thermal isolation package for mounting and containing a relatively high temperature article therein, said package comprising:

a housing larger than said article and enclosing the same therein, said housing being evacuated to a predetermined degree and sealed; and support means including an inner end portion mounting said article and an outer end portion engaging said housing, said support means having a construction providing low thermal conduction losses between said end portions whereby said article is supported and thermally isolated in said housing by said support means, and said support means comprises spring means having a generally spiral configuration which provides a long thermal conduction path between said end portions and which provides both radial and axial alignment support of said article in said housing, said spring means including a pair of thin, flat, spiral springs each supporting a respective end of said article in said housing.

4. The invention as defined in claim 3 wherein said spring means is made of electrically conductive material whereby said spring means can serve additionally as an electrical conductor between said article and said housing.

5. In a thermal isolation package including a housing enclosing a smaller and normally high temperature article which is mounted therein, support means comprising:

a spring device including a thin disc having a radially inner end portion, a radially outer end portion and a radially central body connecting said inner and outer end portions together, a relatively long path being provided between said inner and outer end portions.

6. The invention as defined in claim 5 wherein said central body includes a generally annular body, said inner end portion of said disc includes at least one, narrow, curved finger extending radially inwards from said annular body and said outer end portion of said disc includes at least one, narrow, curved finger extending radially outwards from said annular body.

7. The invention as defined in claim 6 wherein said inner end portion of said disc includes at least three, uniformly spaced, narrow curved fingers extending radially inward from said annular body and said outer end portion of said disc includes at least three, uniformly spaced, narrow curved fingers extending radially outward from said annular body.

8. The invention as defined in claim 6 wherein said annular body includes at least one snubber spring portion protruding radially outwards and terminating at a predetermined distance therefrom.

9. A thermal isolation package for mounting and containing a temperature controlled article therein, said package comprising:

a housing generally larger than said article and substantially containing the same therein, the spacing between said housing and said article being evacuated to a predetermined degree and sealed;

support means including an inner end portion mounting said article and an outer end portion engaging said housing, said support means having a construction providing low thermal conduction losses between said end portions whereby said article is supported and thermally isolated in said housing by said support means, and said support means comprises spring means having a generally spiral configuration which provides a long thermal conduction path between said end portions and which provides both radial and axial alignment support of said article in said housing; and means for limiting displacement of said article from its normally aligned position in said housing.

10. A thermal isolation package for mounting and containing a temperature controlled article therein, said package comprising:

a housing generally larger than said article and substantially containing the same therein, the spacing between said housing and said article being evacuated to a predetermined degree and sealed; and support means including an inner end portion mounting said article and an outer end portion engaging said housing, said support means having a construction providing low thermal conduction losses between said end portions whereby said article is supported and thermally isolated in said housing by said support means, and said support means comprises spring means having a generally spiral configuration which provides a long thermal conduction path between said end portions and which provides both radial and axial alignment support of said article in said housing, said spring means including a pair of thin, flat, spiral springs each supporting a respective end of said article in said housing.

11. In a thermal isolation package including a housing substantially containing a generally smaller and temperature controlled article which is mounted therein, support means comprising:

a spring device including a thin disc having a radially inner end portion, a radially outer end portion and a radially central body connecting said inner and outer end portions together, a relatively long path being provided between said inner and outer end portions.

12. In a thermal isolation arrangement including outer structure generally disposed about inner structure, means for thermally isolating and supporting one of said structures with respect to the other comprising:
a spring device including a thin disc having a radially inner end portion, a radially outer end portion and a radially central body connecting said inner and outer end portions together, a relatively long path being provided between said inner and outer end portions.

* * * * *